United States Patent [19]

Lemercier

[11] 4,055,465
[45] Oct. 25, 1977

[54] DEVICE FOR THERMAL INSULATION OF A VESSEL WALL

[75] Inventor: Guy Lemercier, Le Puy Sainte Reparade, France

[73] Assignee: Commissiariat a l'Energie Atomique, Paris, France

[21] Appl. No.: 707,557

[22] Filed: July 22, 1976

[30] Foreign Application Priority Data
July 24, 1975 France .................................. 75.23153

[51] Int. Cl.² ................................................ G21C 9/00
[52] U.S. Cl. ...................................... 176/87; 176/65; 52/224; 220/9 D
[58] Field of Search ............................. 176/40, 65, 87; 220/9 D, 9 LG; 52/224, 248, 406, 410, 619

[56] References Cited
U.S. PATENT DOCUMENTS

| | | | |
|---|---|---|---|
| 3,009,601 | 11/1961 | Matsch | 220/9 LG |
| 3,159,550 | 12/1964 | Laming | 220/9 DX |
| 3,319,431 | 5/1967 | Clarke et al. | 220/9 LG X |
| 3,764,468 | 10/1973 | Hind | 176/40 |
| 3,935,957 | 2/1976 | Hasegawa | 220/9 LG |
| 3,945,165 | 3/1976 | Lemercier | 176/87 X |
| 3,945,887 | 3/1976 | Lemercier | 176/87 |

Primary Examiner—Peter A. Nelson
Attorney, Agent, or Firm—Cameron, Kerkam, Sutton, Stowell & Stowell

[57] ABSTRACT

A thermal insulation structure mounted within the annular space between the primary vessel and the inner vessel of a liquid metal cooled fast reactor is constituted by a plurality of heat-insulating elements extending circumferentially around the common axis of the two vessels and consisting of half-casings each formed by two interengaged L-section members packed with flexible and compressible heat-insulating material.

7 Claims, 3 Drawing Figures

DEVICE FOR THERMAL INSULATION OF A VESSEL WALL

This invention relates to a device for thermal insulation of the wall of a vessel or the like and applies more especially although not exclusively to the vessel of a nuclear reactor which is cooled with water, steam, a gas or a liquid metal. The invention applies even more especially to the primary vessel of a fast reactor which contains a given volume of a liquid metal and especially sodium. Said liquid metal is circulated through the reactor core which is mounted within the vessel in order to gain the heat generated by the nuclear fission process and subsequently to restitute said heat within heat exchangers which are also immersed within the vessel. The circulation of liquid metal is carried out by means of pumps which are arranged in spaced relation with the heat exchangers around the reactor core.

It is known that, in a nuclear installation of this type, the primary vessel containing the liquid sodium coolant is usually designed in the form of a lateral cylindrical shell having a vertical axis and extended at the lower end by a hemispherical end wall, said vessel being open at the top and suspended from a horizontal steel-lined concrete vault roof. The free space between the vault roof and the level of sodium within the vessel is filled with an insulating layer of inert gas usually consisting of argon, this latter being charged with sodium aerosols at the time of reactor operation. It is also known that, in order to establish the circulation of sodium through the reactor core, the heat exchangers and the pumps, the primary vessel usually contains a second vessel having a smaller wall thickness. This inner vessel is provided with a lateral skew wall for separating the two regions in which the sodium is respectively at different temperatures prior to and after passing through the heat exchangers. Said skew wall is advantageously provided with an edge or rim and this latter is joined to the primary vessel wall. Finally, in order to cool the primary vessel and to ensure that this latter is not subjected to excessive thermal gradients in a vertical plane, the conventional solution consists in diverting part of the flow of cold sodium at the outlet of the heat exchangers and circulating this latter in contact with the internal surface of the primary vessel between this latter and a baffle-plate which lines the vessel. Said baffle-plate can in some cases be joined to the skew wall of the inner vessel and extend said wall in order to line the wall opposite to the primary vessel and to delimit with this latter a continuous annular space.

In designs of this type, however, the withdrawal of a fraction of the sodium flow for cooling the primary vessel, namely a fraction of the order of 3% of the total flow, constitutes a not-negligible cause of limitation of the thermal efficiency of the installation. Moreover, this design solution offers only a relative degree of effectiveness since the loss of heat is of the order of 20 MW in a high-power reactor of the order of 1200 MWe. It should be noted that, in all cases, the extension of the inner vessel which delimits the above-mentioned annular space with the primary vessel has a free end in the insulating layer of inert gas beneath the reactor vault roof. By reason of its considerable dimensional variations both in diameter and in height at the time of thermal cycles which take place during reactor operation, the above-mentioned inner vessel cannot be attached to a rigid structure such as the reactor vault roof, for example, in order to isolate the annular space in leak-tight manner. Said annular space is therefore in pressure equilibrium with the inert gas above the level of sodium.

This invention relates to a device for thermal insulation of a vessel and especially of the internal wall of the primary vessel of a liquid metal cooled fast reactor, within an annular space delimited between the primary vessel and an inner vessel which is enclosed by said primary vessel and has a free extremity which serves to limit heat exchanges within said annular space and consequently to reduce to the most significant degree the stresses produced within the primary vessel at the time of thermal cycles, especially within those regions of the primary vessel in which said vessel is suspended from the reactor vault roof.

To this end, the device under consideration comprising a heat-insulating structure mounted within the annular space between the primary vessel and the inner vessel is distinguished by the fact that said structure is constituted by a plurality of superposed resilient heat-insulating elements, said elements being such as to extend circumferentially around the common axis of the two vessels.

Generally speaking, it should be pointed out that the term "inner vessel" as used in this description must be considered in its broadest sense. Thus the thermal insulation device under consideration can be employed in the same manner within any annular space formed between the internal wall of the primary vessel and any oppositely-facing element which is enclosed by said wall and is constituted either by the external surface of the inner vessel proper or by a parallel shell or baffle-plate which may or may not be joined to said inner vessel.

As a preferable feature, the resilient heat-insulating elements are constituted by half-casings each formed by two L-section members fitted one inside the other with a small clearance between the opposite lateral faces of said L-section members, the space delimited within the interior of the half-casing being filled with flexible and compressible heat-insulating material. Advantageously, in order to form continuous elements which are completely closed and capable of remaining in position within the annular space between the two vessels, the L-section members are each provided with an extension at one end which is also capable of engaging within an adjacent L-section member and so on in sequence from one member to the next.

In accordance with a particular feature of the invention, the heat-insulating material of the resilient elements is constituted by a stack of wire fabric or wire mesh elements with interposition of at least one small metal plate which extends parallel to the bottom portions of the two L-section members of the casing.

In accordance with a particular feature and especially in the case in which the primary vessel and the inner vessel have a common vertical axis, the primary vessel being suspended from a horizontal vault roof which delimits with the level of liquid metal within the inner vessel a space filled with an insulating layer of inert gas charged with liquid metal aerosols, the free end of the inner vessel is isolated from the gas layer by a cylindrical baffle-plate mounted beneath the vault roof and coaxial with the inner vessel, said baffle-plate being immersed in the liquid metal. By way of alternative, the baffle-plate is immersed in an annular cup filled with liquid metal which is carried by the wall of the inner vessel. Finally and as an advantageous feature, the external and internal walls of the baffle-plate are in turn covered with elements of resilient heat-insulating material which are similar to the elements mounted within the annular space.

Further properties of a thermal insulation device as constructed in accordance with the invention will become apparent from the following description of one exemplified embodiment given by way of indication but not in any limiting sense, reference being made to the accompanying drawings, wherein.

Figure 1:
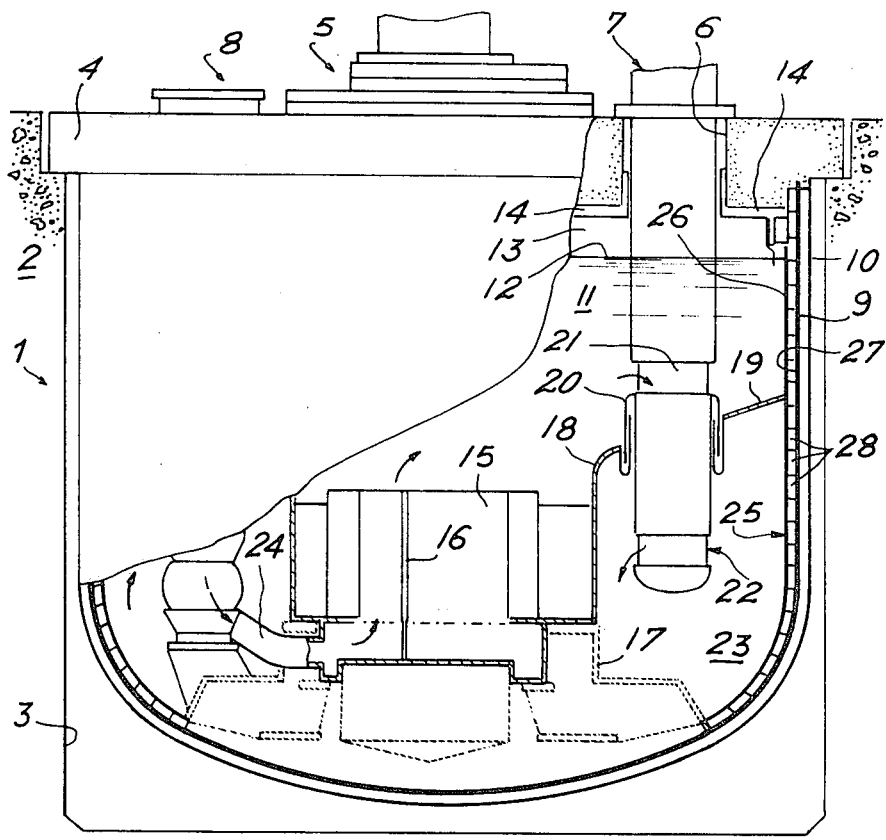
FIG. 1 is a diagrammatic and fragmentary vertical sectional view of a fast reactor comprising a primary vessel and an inner vessel delimiting an annular space in which is mounted the thermal insulation device under consideration.

FIG. 1 illustrates a diagrammtic sectional view of a fast reactor which is cooled by a liquid metal and generally designated in the drawing by the reference 1. This reactor comprises in particular a thick-walled concrete vault 2 defining an internal cavity 3, the top portion of which is closed by a horizontal concrete vault roof 4. Said vault roof supports handling devices 5 shown diagrammatically in broad outline and intended to gain access to the interior of the cavity 3 through the vault roof 4 and has through-passages 6 for the components which are necessary for the operation of the reactor such as heat exchangers 7 and circulating pumps 8. In order to contain the reactor core, the internal cavity 3 of the vault 2 encloses a first vessel 9 or so-called primary vessel comprising a shell of cylindrical shape having a vertical axis with an approximately hemispherical bottom wall, the top portion of said primary vessel being suspended from the vault roof 4. Said primary vessel is surrounded externally by a second vessel 10 which is coaxial thereto, has the same profile and is known as a safety vessel or leak-jacket.

The primary vessel contains a suitable volume of liquid metal coolant 11 usually consisting of sodium, the level of coolant within the primary vessel being shown at 12 in the drawing. Between said level 12 and the vault roof 4, there is thus formed a space 13 for positioning an insulating layer of inert gas which usually consists of argon and isolates the liquid metal from the vault roof. There is advantageously mounted against the opposite surface of said roof a heat-insulating lining 14 which is capable of protecting the structures of the vault roof from the temperature existing within the insulating layer 13 and also against sodium aerosols in suspension in this latter.

The reactor core 15 is placed within the primary vessel 9 and formed in the conventional manner by the juxtaposed arrangement of fuel assemblies, only one of which is shown in the drawing, namely the fuel assembly 16. Said reactor core 15 rests on a support structure or diagrid 17, said diagrid being in turn applied against the bottom wall of the primary vessel 9. The hot sodium is separated from the volume remaining within the primary vessel by another inner vessel 18 having a smaller wall thickness and surrounding the reactor core in coaxial relation with the primary vessel. Said inner vessel 18 is provided with a lateral skew wall 19 traversed by the heat exchangers 7 and the pumps 8 through the intermediary of sealing devices 20 which are shown diagrammatically. The hot sodium within the inner vessel 18 penetrates through the inlets 21 into the heat exchangers 7. After cooling, the liquid sodium is discharged from said heat exchangers via outlets 22 and collected in a space 23 formed between the inner vessel 18 and the primary vessel 9. Said cold sodium is then recycled by the circulating pumps 8, then returned beneath the reactor core support diagrid 17 via ducts 24 mounted on the discharge side of said pumps and having a large cross-sectional area in order to undergo a further passage through the reactor core.

In accordance with a known arrangement, the skew wall 19 which forms a lateral extension of the vessel 18 extends to the proximity of the internal wall of the primary vessel 9 and is joined to a cylindrical shell, the lower portion 25 of which is parallel to the wall of said vessel 9 and is joined to the diagrid 17 in leak-tight manner. Furthermore, said vessel 18 has an upper extension 26 provided with a free end which emerges in the insulating gas layer 13 above the level 12 of the sodium within the vessel 9. These shell sections 25 and 26 which are attached to the inner vessel 18 thus delimit with the oppositely-facing wall of the primary vessel 9 a continuous annular space 27 which extends along the peripheral contour of the vessel 9. In accordance with the invention, said annular space 27 is provided for positioning heat-insulating elements 28, the constructional detail of which will hereinafter be described in greater detail.

Figure 2:
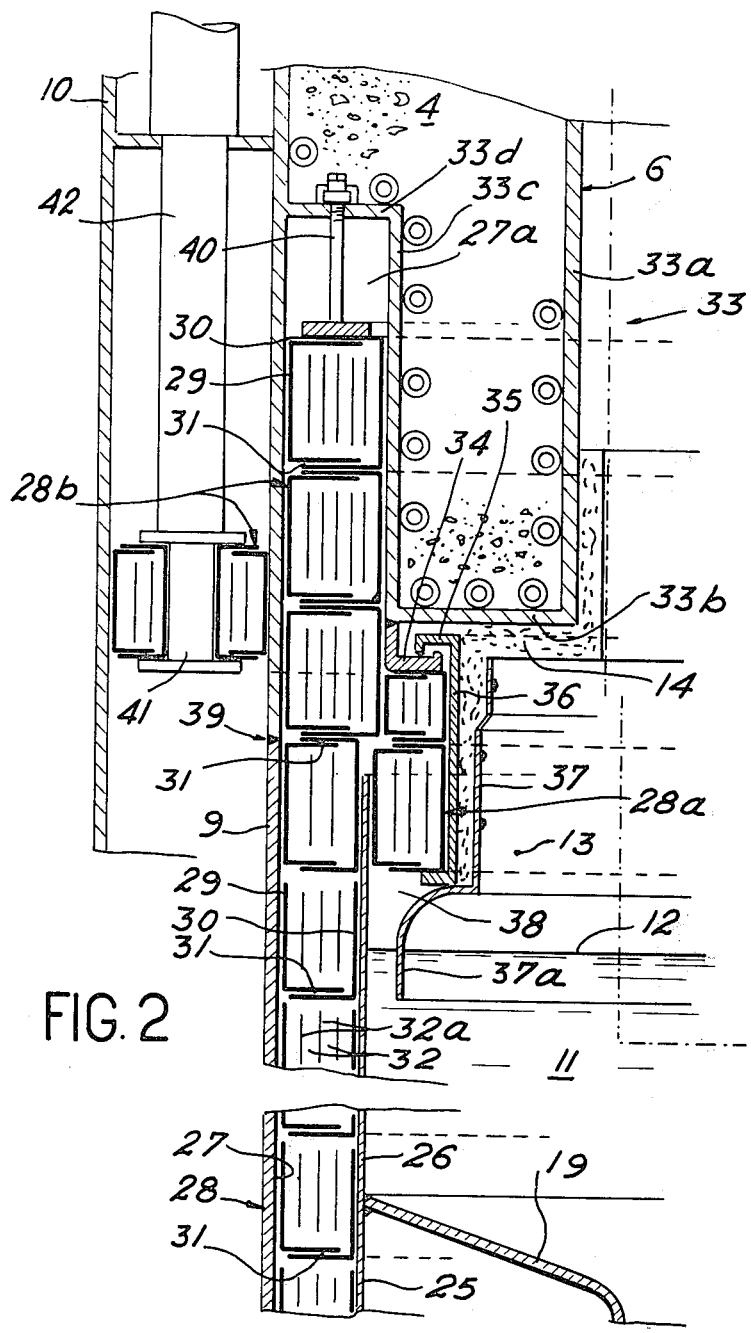
FIG. 2 is a detail view to a larger scale showing part of the annular space and of the heat-insulating elements.

Referring in fact to FIG. 2 in which the upper end of the primary vessel 9 and of the cylindrical portions 25 and 26 which extend the skew wall 19 of the inner vessel 18 downwards and upwards respectively, it is apparent that the annular space 27 is filled with a superposed assembly of resilient heat-insulating elements 28 which make it possible to insolate the oppositely-facing walls of the two vessels by virtue of their anti-convective effect. Preferably, said resilient heat-insulating elements 28 are constituted by means of two L-section members 29 and 30 respectively which fit one inside the other so as to form a clearance space 31 of small width between said members. The internal region of the casings which is delimited by the L-section members 29 and 30 is open and filled with a flexible material 32 which is preferably constituted by a stack of wire fabric, wire mesh, interlooped wire fabric or other elements of the same type such as a packing of steel wool or the like. Said flexible material 32 advantageously incorporates a series of thin metal plates 32a which are parallel to each other and intended to limit convection currents through the elements. As an advantageous feature, said elements are so designed as to extend in a continuous manner through the entire annular space 27, the L-section members employed being provided at one end with an extension which is capable of engaging in the adjacent L-section member so as to constitute a completely closed and continuous assembly.

Since the upper portion 26 of the shell which forms an extension of the skew wall 19 and the inner vessel 18 has its free end within the insulating gas layer 13, the annular space 27 which is packed with the heat-insulating elements 28 is in direct communication and consequently in pressure equilibrium with said insulating layer above the level 12 of sodium within the vessel 9. Under these conditions the sodium aerosols which are present within said gas layer would be liable to spread within the annular space 27 and to produce thermal short-circuits within the elements which are placed therein. In order to circumvent this disadvantage, provision is made in accordance with the invention to isolate the space 27 from the insulating layer 13 by means of an auxiliary arrangement which is also illustrated in FIG. 2.

To this end, the reactor vault roof 4 from which the vessels 9 and 10 are suspended is provided with a metallic lining 33 which in turn has an extension either in the form of shells 33a at the point of penetration of the bores 6 formed in the vault roof 4 for the transfer of the reactor components or in the form of a bottom lining plate 33b beneath the vault roof or finally in the form of a lateral shell 33c which is joined by means of a horizontal flange 33d to the internal surface of the primary vessel 9. Beneath the bottom lining plate 33b and in the vicinity of the lateral shell 33c, the lining 33 is fitted with a circular L-sectin member 34 for the attachment of a flange 35 forming an extension of a thin-walled baffle-plate 36 which extends vertically beneath the vault roof and accommodates internally the heat-insulating structure 14 mentioned in the foregoing. The cover plates or so-called casing plates 37 are applied against this structure and extended in the downward direction by a second baffle-plate 37a which extends beneath the level 12 of the sodium 11 within the vessel, thus limiting a space 38 for the insulating gas layer 13 between said baffle-plate 37a and the upper cylindrical extension 26. Said space 38 is confined in order to prevent excessive production of sodium vapor and aerosols and in turn communicates with the region 13 and the spaces 27 and 27a, said region being delimited beneath the flange 33d between the vessel 9 and the shell 33c.

As an advantageous feature, the baffle-plate 36 is associated with resilient heat-insulating elements 28a formed of U-section members in interengaged relation so as to delimit between the faces of these latter capillary spaces which are capable of trapping the sodium vapor and aerosols of the space 38. Arrangements of this type have also been described and claimed in the French patent Application cited earlier. Similar elements 28b or the like, for example in accordance with the arrangements described and claimed in U.S. patent Appl. Ser. No. 594,644 are mounted within the annular space 27a. It should be noted that these elements 28b which are initially mounted at the top of the space 27a in order to permit the formation of the welded joint 39 of the primary vessel 9 during construction can be vertically displaced at the end of the assembly operation and resiliently maintained against the elements 28 by means of a compression device 40. Finally, elements 28b of this type can be mounted within the space formed between the primary vessel 9 and safety vessel or leak-jacket 10, these elements being placed in this case on each side of a supporting unit 41 which is suspended by means of tie-rods 42 from the upper portion of the reactor vault roof 4.

Figure 3:
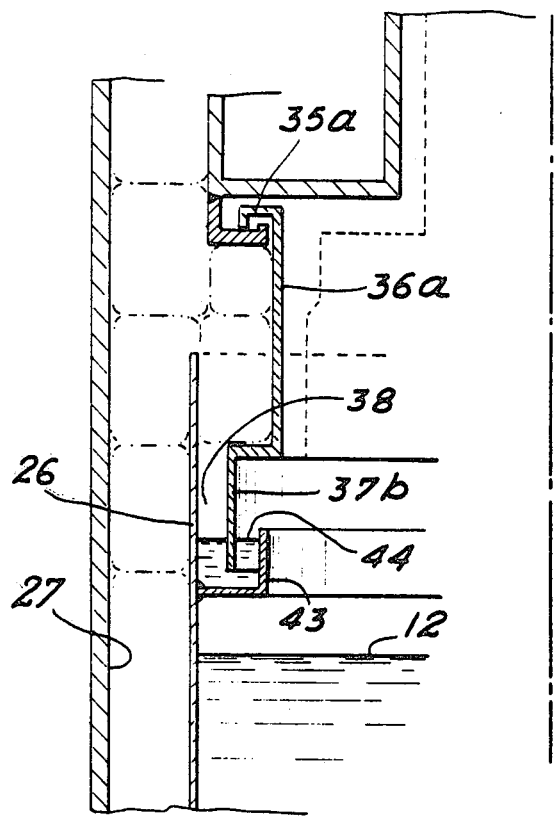
FIG. 3 is another detail view of an alternative form of construction.

In another alternative form of construction illustrated in FIG. 3, the baffle-plate 36a which is mounted beneath the lining 33 of the vault roof 4 has a flange 35a and a bottom portion 37b which extends into a cup 43. Said cup is rigidly fixed to the internal wall of the extension 26 of the inner vessel and is filled with a suitable quantity of sodium 44 so as to form a seal between the spaces 27 and 13.

Whatever alternative embodiment may be adopted, the positioning of flexible and elastic heat-insulating elements within the annular space provided between the extension of the inner vessel and the primary vessel makes it possible to remove one relatively important cause of loss of heat while at the same time ensuring protection of the inner wall of said primary vessel from high thermal gradients and limiting the mechanical stresses which would consequently be liable to arise. Moreover, the mounting of a baffle-plate beneath the reactor vault roof so as to extend beneath the level of the liquid metal employed for cooling the reactor and contained in the primary vessel serves to isolate the annular space thus filled with heat-insulating elements from the aerosols of the liquid metal. This prevents the creation of thermal short-circuits within these elements without thereby entailing the need to ensure that the upper end portion of the inner vessel extension is attached to a rigid structure. Said upper end portion can therefore readily be subjected to the dimensional variations imposed by thermal cycling during reactor operation.

What I claim is:

1. A device for thermal insulation of a vessel and especially of the internal wall of the primary vessel of a liquid metal cooled fast reactor, within an annular space delimited between the primary vessel and an inner vessel which is enclosed by said primary vessel and has a free extremity, wherein said device comprises a plurality of superposed resilient heat-insulating elements, said elements being such as to extend circumferentially around the common axis of the two vessels, the primary vessel and the inner vessel having a common vertical axis, the primary vessel being suspended from a horizontal vault roof which delimits with the level of liquid metal within the inner vessel a space filled with an insulating layer of inert gas charged with liquid metal aerosols, the free end of the inner vessel being protected from the insulating gas layer by a cylindrical baffle-plate mounted beneath the vault roof and coaxial with the inner vessel, said baffle-plate being immersed in the liquid metal.

2. A heat-insulating device according to claim 1, wherein the resilient heat-insulating elements are constituted by half-casings each formed by two L-section members fitted one inside the other with a small clearance between the opposite lateral faces of said L-section members, the space delimited within the interior of the half-casing being filled with flexible and compressible heat-insulating material.

3. A heat-insulating device according to claim 2, wherein the L-section members are each provided with an extension at one end which engages within an adjacent L-section member and so on in sequence from one member to the next.

4. A heat-insulating device according to claim 2, wherein the heat-insulating material of the resilient elements is constituted by a stack of wire fabric, and also wire mesh and also interlooped wire elements with interposition of at least one small metal plate which extends parallel to the bottom portions of the two L-section members of the casing.

5. A heat-insulating device according to claim 1, wherein the baffle-plate is immersed in an annular cup filled with liquid metal which is carried by the wall of the inner vessel.

6. A heat-insulating device according to claim 5, wherein the external and internal walls of the baffle-plate are in turn covered with elements of resilient heat-insulating material.

7. A heat-insulating device according to claim 6, wherein the resilient heat-insulating elements which are mounted against the baffle-plate are formed by means of two interengaged U-section members which delimit leak-tight capillary spaces between the radial sides thereof in order to trap the liquid metal vapor and aerosols.

* * * * *